United States Patent [19]

Winter

[11] Patent Number: 4,821,806
[45] Date of Patent: Apr. 18, 1989

[54] IMPLEMENT HAVING PARALLEL CYLINDER DEPTH CONTROL AND SERIES CYLINDER LIFT

[75] Inventor: David C. Winter, Johnston, Iowa

[73] Assignee: Deere & Company, Moline, Ill.

[21] Appl. No.: 904,575

[22] Filed: Sep. 5, 1986

[51] Int. Cl.⁴ .......................................... A01B 63/111
[52] U.S. Cl. .......................................... 172/4; 91/518; 91/520; 280/43.23
[58] Field of Search .............. 172/2, 4, 7, 9, 401, 172/413, 421; 91/445, 448, 450, 511, 520, 522, 525, 530, 532, 518; 280/43.23

[56] References Cited

U.S. PATENT DOCUMENTS

| | | | |
|---|---|---|---|
| 3,627,053 | 12/1971 | Hook et al. ...................... | 91/520 X |
| 3,630,290 | 12/1971 | Williams et al. ..................... | 172/7 |
| 3,774,696 | 11/1973 | Horsch ............................ | 91/520 X |
| 4,343,151 | 8/1982 | Lorimor ........................... | 91/520 X |
| 4,427,207 | 1/1984 | Gafford ........................... | 280/43.23 |
| 4,579,038 | 4/1986 | Winter ............................. | 91/30 |
| 4,600,060 | 7/1986 | Winter et al. ...................... | 172/4 |

FOREIGN PATENT DOCUMENTS 54-8272  1/1974  Japan ............................... 91/520

Primary Examiner—Richard T. Stouffer

[57] ABSTRACT

Hydraulic lift cylinders on a transversely extending implement frame, such as a multi-section hinged implement, are connected by valve and conduit structure to operate as single acting cylinders in parallel during an automatic depth control mode for individual cylinder control. An operator control valve and depth sensing valve permit the operator to change to a fast raise/fast lower mode wherein flow control structure causes the lift cylinders to operate substantially in series for raising and lowering the implement in level fashion across its width to and from a transport position.

17 Claims, 3 Drawing Sheets

IMPLEMENT HAVING PARALLEL CYLINDER DEPTH CONTROL AND SERIES CYLINDER LIFT

BACKGROUND OF THE INVENTION

The present invention relates generally to hydraulic lift systems for multiple section or wide single section implements or the like, and more specifically, to a depth control system wherein the cylinders act in parallel through depth control valves to control individual sections or frame portions during field operation and wherein the cylinders operate essentially in series to permit the sections to move vertically in unison during raising and lowering to and from the transport position for turning, changing draft in the field, etc.

Wide implements such as field cultivators, chisel plows and air seeders typically include a main frame and outrigger frames pivotably connected to the main frame with separate hydraulic cylinders to control raising and lowering of the main and outrigger frames for proper depth control during field-working operations, for reducing hitch load to reduce spin-out and for movement to and from a transport position. Series cylinders have been utilized to assure that the different frame sections raise and lower in unison, but with a series system it is difficult or impossible to provide individual depth control of each section independently of the other sections. Series cylinder arrangements also require careful selection of cylinder size to assure operation in unison, and additional components are typically provided to rephase the cylinders upon full extension or retraction to compensate for leakage of hydraulic fluid.

Various depth control systems are available which utilize a hydraulic or electro-hydraulic control system to individually control the cylinder or cylinders on each separate frame section, such as shown in U.S. Pat. No. 4,600,060. A depth control valve for use with such a system is shown in U.S. Pat. No. 4,579,038. With such an arrangement as shown in the above-mentioned patents the cylinders are essentially operated in parallel during a fast raise/fast lower mode which results in uneven raising and lowering of the individual sections since the section having the least resistance will raise first and the section with the most weight will tend to lower first. Because the sections do not lift and lower in unison, ground-engagement and disengagement across the width of the implement will vary considerably unless the operator slows or stops the towing vehicle during the raise and lower modes at the end and start of a field-working operation.

Objects of the Invention

It is therefore an object of the present invention to provide an improved hydraulic lift system for a multi-section implement. It is a further object to provide such a system wherein each section of the multiple section machine is controlled independently for accurate depth control but wherein the sections can be raised and lowered in unison between the transport and field-working positions.

It is a further object of the present invention to provide an improved depth control system for a multi-section implement with a plurality of lift cylinders wherein the cylinders will function substantially in parallel through individual depth control valves during the field-working operation and which will also raise and lower approximately in series as the frames are moved between their field-working and transport positions.

It is still another object of the present invention to provide an improved depth control system for a multi-section implement which is fully operable through a single reversible operator control valve and yet which provides responsive individual depth control for each section along with fast raising and lowering of the complete implement in unison between the transport and field-working positions.

It is still another object of the present invention to provide an improved depth control system for a multi-sectioned implement wherein the automatic depth control feature may be overridden at any time by movement of a single operator control valve, and upon operation of the valve the hydraulic lift cylinders will operate essentially in series to lift the individual sections of the implement in unison.

It is yet another object of the present invention to provide an improved depth control system for operating the cylinders on a multi-sectioned implement wherein the depth control system includes a depth control valve connected to a single acting cylinder. It is a further object to provide such a system wherein the cylinders are plumbed for operation substantially in parallel in a depth control mode, and for operation essentially in series in a fast raise and fast lower mode.

Brief Description of the Invention

In one embodiment of the invention, a flexible, multi-sectioned implement includes at least two frame sections with a hydraulic control lift system. The lift system includes a depth control valve associated with each section and responsive to changes in implement frame height in a depth control mode. The depth control valve is connected to a lift cylinder for the corresponding section and to a source of fluid under pressure through an operator control valve. The individual valves and cylinders are connected to the source for operation essentially in parallel to provide individual depth control for each section in the depth control mode. The cylinders operate as single acting cylinders. Upon movement of the operator control valve to a position wherein the pressure and reservoir lines are reversed, the depth control valve moves to a position facilitating fast raise/fast lower operation wherein fluid under pressure is directed through the first valve to the first cylinder. An orifice and check valve connected in parallel between the rod-end of the first cylinder and the reservoir in the fast raise mode directs fluid to the cylinder end of the second cylinder so that the first and second cylinders extend essentially in series, rather than acting in a parallel relationship, so that the frame sections will raise in unison. Uneven operation of the implement when it is lifted to the transport position is thus prevented. Also the operator may momentarily override the depth control feature to raise the earthworking tools in unison, for example, when the operator wishes to reduce the load on the towing vehicle when the tractor begins to spin out under heavy load conditions. Upon movement of the operator control valve to the automatic control position, the sections will lower substantially in unison under most conditions as the first cylinder retracts and fluid from the second cylinder is drawn into the rod-end of the first cylinder. The frame sections will lower at a relatively fast rate until the depth control valve reaches it automatic control range.

In another embodiment, automatic depth control is provided on the center section by two mechanically linked cylinders operating in parallel through a depth control valve. Mechanical depth stops or separate depth control valves are provided for the outrigger cylinders. Flow control structure causes each outrigger cylinder to operate in series with the adjacent center section cylinder during the fast raise/fast lower mode so that the implement raises and lowers uniformly across its width to and from transport position. In the automatic depth control mode, the center section is controlled independently of the outriggers.

The hydraulic system is relative simple in construction and can be easily adapted to most conventional wide or multi-section implements and existing tractor hydraulic systems. Complete control of implement raising and lowering, as well as selection of an automatic depth control mode, is achieved through a single reversible operator control valve on the tractor. The hydraulic system has the advantages of a parallel system in the depth control mode, permitting individual cylinder control, and has the advantages of a series system in the fast raise/fast lower mode, causing the implement to raise uniformly across its width.

These and other objects, features and advantages of the present invention will become apparent to those skilled in the art upon from the following description read in view of the drawings.

Description of the Preferred Embodiment

Figure 1:
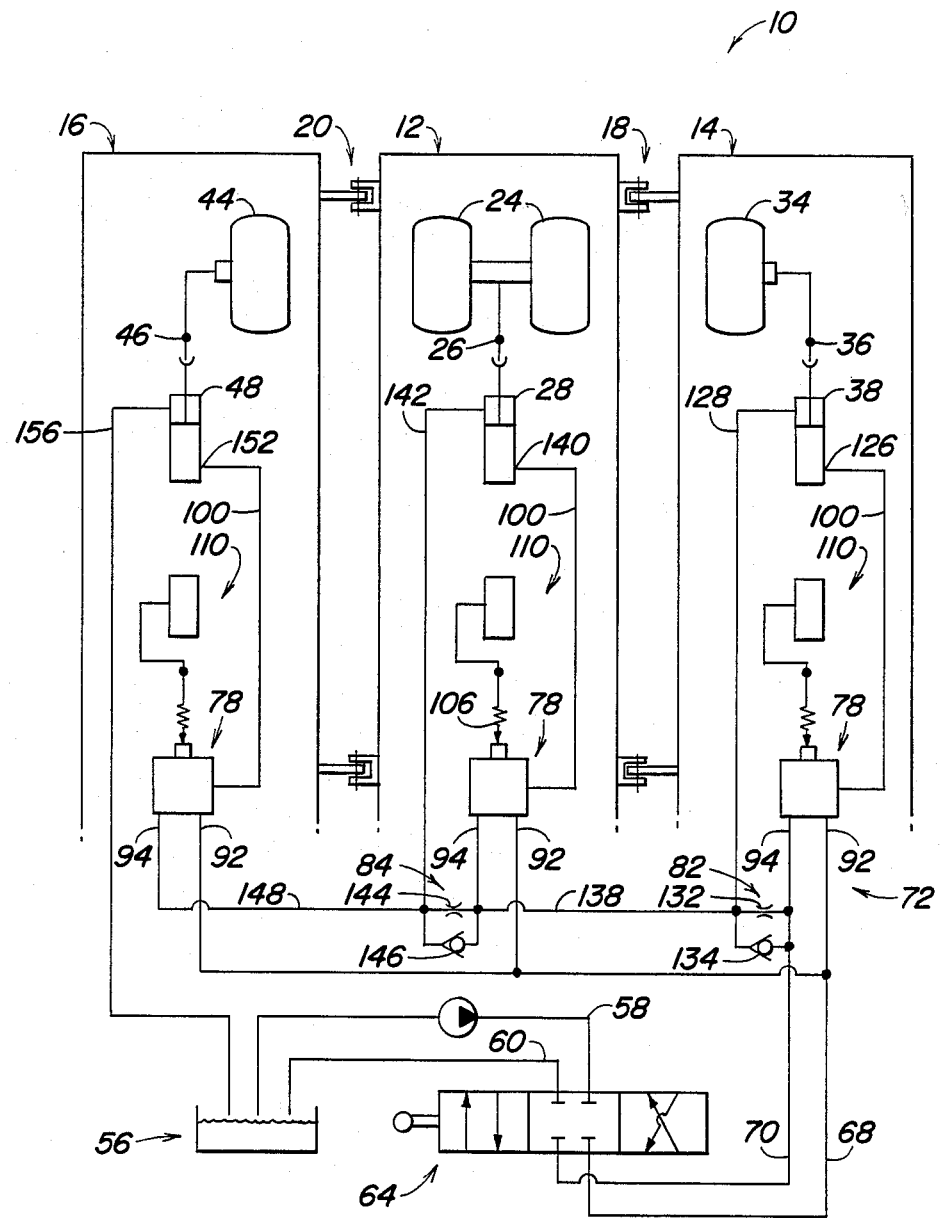
FIG. 1 is a diagramatic illustration of the hydraulic system for a three section implement.

Referring now to FIG. 1, there is shown a portion of a multi-section implement 10 having a main center frame 12 with outrigger frames 14 and 16 pivotally connected to the center frame by pivot structure 18 and 20, respectively. The center frame 12 is supported on a plurality of ground wheels 24 connected to the frame by a rockshaft 26 or other suitable arrangement to provide for selectively raising and lowering the frame by a hydraulic cylinder 28. The outrigger 14 is supported above the ground by a ground wheel 34 connected by a suitable rockshaft arrangement or other device 36 for rocking by a hydraulic cylinder 38 for selectively raising and lowering the outrigger frame 14. The outrigger frame 16 is supported in a similar manner to that of frame 14 by a ground wheel 44, rockshaft 46 and a hydraulic cylinder 48.

Each of the frames 12, 14 and 16 carries earth working tools 52 (FIG. 2), the depth of penetration of which is dependent upon the height of the respective frame above the surface of the ground. A conventional towing vehicle (not shown), such as a typical agricultural tractor, is connected to the implement 10 for towing the sections forwardly over the field. The towing vehicle includes a source of hydraulic fluid under pressure 56 with a pressure line 58 and a return to reservoir line 60. The pressure and return lines 58 and 60 are connected through a reversible operator control valve 64 to connecting lines 68 and 70 which extend to the multi-section implement 10. The lines 68 and 70 are connected to hydraulic valve and connecting conduit structure indicated generally at 72 located on the implement 10. The valve and conduit structure 72 for the embodiment of FIG. 1 includes depth control valve structure 78 associated with each of the sections or frames 12, 14 and 16 and two flow control structures 82 and 84 arranged to cause the cylinders 28, 38 and 48 to operate essentially in parallel under control of the associated depth control valve structure 78 during normal soil-working operations in an automatic depth control mode while causing the cylinders to act substantially in series when the control valve 64 is reversed to raise the implement toward the transport position in a fast raise mode.

In the preferred embodiment (FIG. 2), the depth control valve structure 78 includes a four-position valve of the type shown and described in the aforementioned U.S. Pat. No. 4,579,038. The valve 86, however, is slightly modified by capping the output valve port at 88 for providing single acting cylinder operation rather than two-way operation. The control valve 86 has four positions including a balanced or neutral position labeled "A", a slow raise position "B", a slow lower position "C" and a fast raise/fast lower position "D". The valve 86 has two input ports 92 and 94, and an output port 96. The port 96 is connected via a check valve 98 to a connecting line 100 which in turn is connected to the cylinder end of the corresponding one of the cylinders 28, 38 or 48. The check valve 98 is pilot operated and opens upon fluid pressure being applied to the input port 92, the pressure being communicated to the check valve 98 via a branch line 104.

Figure 2:
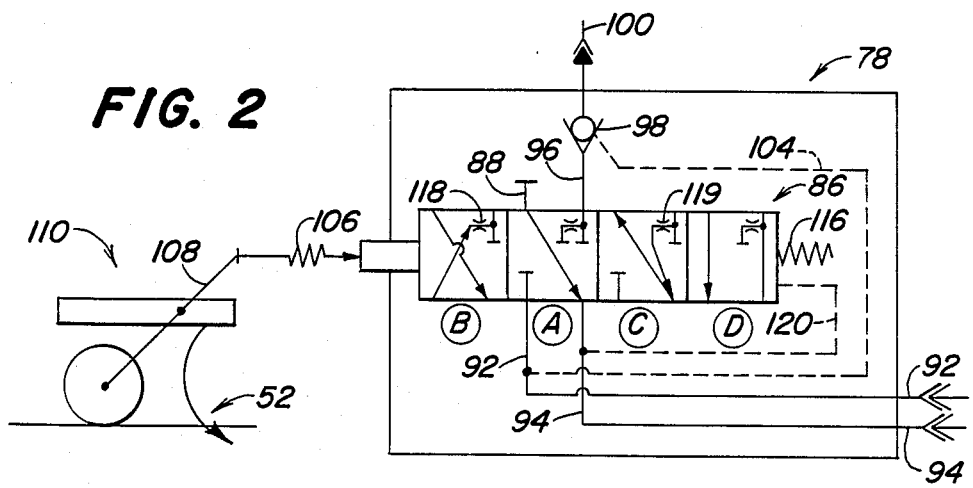
FIG. 2 is a diagramatic view of the depth control valve structure utilized with the system of FIG. 1.

The spool of the valve 86 is connected through a compression spring 106 acted upon by a linkage 108 of a conventional depth or height sensing arrangement 110 connected to the implement frame (FIG. 2). The sensing arrangement 110 may be of any suitable type, such as the type shown in the aforementioned U.S. Pat. No. 4,600,060. A second spring 116 acts against the opposite end of the spool of the valve 86. For automatic height adjustment, the operator control valve 64 is moved from the neutral position shown in FIG. 1 toward the right so that the line 68 is pressurized to pressurize the ports 92 of each valve 86 through the valve and conduit structure 72 which will be described in detail later. The port 94 is connected through the conduit structure 72 and through the line 70 and valve 64 to the reservoir. When the given frame section of the implement 10 is at the proper height to provide the desired soil penetration of the tool 52, the valve 86 will be in the balanced position "A" as shown in FIG. 2. If the frame should lower below the desired height to increase the depth of penetration of the tool 52, the linkage 108 will act against the spring 106 to move the spool of the valve 86 to the slow raise or "B" position which will cause fluid flow from the port 92 through a restrictor or orifice 118 to the port 96 and line 100 to extend the associated hydraulic cylinder to raise the frame until the tool 52 is in the proper depth range. If the frame raises above a preselected height, the linkage 108 reduces the tension of the spring 106 and the spring 116 moves the spool of the valve 86 to the left to the slow lower "C" position. In the slow lower position the output port 96 is opened through a restrictor or orifice 119 and through the input port 94 and line 70 to the reservoir to permit the corresponding cylinder to retract under the load of the implement frame. If the operator desires to raise the entire implement towards the transport position, he simply moves the operator control valve 64 to the left so that the line 70 is now pressurized and the line 68 is returned to reservoir. Upon pressurization of the line 70, the input port 94 of the valve 86 is pressurized, and the pressure at the port 94 is communicated through a branch line 120 to the right side of the spool of the valve 86. The pressure communicated through the line 120 in combination with the spring pressure of the compression spring 116 overcomes any pressure applied by the spring 106 and moves the spool of the valve 86 completely to the left to the fast raise/fast lower "D" position. In the "D" position fluid under pressure at port 94 is communicated directly to the line 100 to quickly extend the corresponding cylinder and raise the frame section towards the transport position. When the valve 86 is in the "D" position, reversal of the operator control valve 64 to again pressurize the line 68 and return the line 70 to reservoir causes the corresponding cylinder to quickly retract under the weight of the frame section until the height sensing arrangement 110 reaches the automatic depth control range wherein the linkage 108 acting against the spring 106 will cause the valve spool of the valve 86 to move to the "C" position; thereafter the frame will lower slowly to the final operating position wherein the valve will assume its "A" or balanced position. For a more detailed description of the valve 86 and its operation in combination with the operator control valve 64, reference may be had to the aforementioned U.S. Pat. No. 4,579,038.

The hydraulic valve and connecting conduit structure 72 will now be described in full detail to show how the system operates in parallel in the depth control mode and substantially in series when the implement 10 is raised towards the transport position in the fast raise/fast lower mode. The line 68, which corresponds to the pressure line when the operator control valve 64 is positioned for automatic depth control, is connected directly to the input ports 92 on each of the three valves 86 of the valve control structures 78. The return line 70 is connected directly to the input port 94 of the first valve structure 78 (on the frame 14 as shown in FIG. 1). The line 100 connects the output port 96 of the corresponding valve to the input port 126 at the cylinder or base end of the first cylinder 38. The rod end of the cylinder 38 is connected via return line 128 and the flow control structure 82 to the return line 70. The structure 82 includes a flow line restrictor 132 connected in parallel with a check valve 134 for providing relatively unrestricted flow from the left to the right through the structure 82 as viewed in FIG. 1 while substantially limiting flow from the line 70 toward the left when the operator control valve 64 is reversed to pressurize the line 70. The input port 94 of the second valve structure 78 is connected via line 138 to the return line 128 from the rod end of the cylinder 38 and to the left side of the flow control structure 82.

The line 100 from the second valve structure 78 (on the frame 12 as shown in FIG. 1) connects the port 96 with an input port 140 at the base end of the cylinder 28. The rod end of the cylinder 28 is connected through a return line 142 to the left side of the flow control structure 84 which includes a flow restrictor 144 and a check valve 146 connected in parallel. The right side of the flow control structure 84 is connected to the input port 94 of the second valve structure 78 and to the end of the line 138. The input port 94 of the third or last depth control valve structure 78 (on the frame 16 as shown in FIG. 1) is connected via line 148 to the return line 142 connected to the rod end of the cylinder 28 and to the left side of the second flow control structure 84. The line 100 connects the output port 96 of the last valve structure 78 to input port 152 of the third or last cylinder 48. The rod end of the cylinder 48 is connected to a return line 156 which opens the rod end of the cylinder 48 to reservoir.

In the depth control mode with the operator control valve 68 positioned to the right so that the line 68 is pressurized and the line 70 is returned to reservoir, fluid under pressure is supplied to each of the three ports 92 of the valve structure 78. Each of the valve structures 78 functions to independently control the corresponding one of the hydraulic cylinders 38, 28 or 48 to raise and lower the corresponding ground wheels as necessary to maintain the working depth of the tools 52 within a preselected range. If the outrigger frame 14 (FIG. 1) drops below a preselected height, the corresponding valve 86 (FIG. 2) is shifted to the slow raise position "B" to cause fluid under pressure to flow from the port 92 through the orifice 118 to the port 96 and the line 100 to extend the cylinder 38. Oil from the rod end of the cylinder 38 has an unrestricted path to the oil return line 70 through the line 128 and the check valve 134. Likewise, automatic extension of the cylinder 28 on the frame 12 causes unrestricted fluid flow from the rod end of the cylinder 28 through the line 142 and through the check valves 146 and 134 to the line 70. Unrestricted fluid flow from the rod end of the cylinder 48 upon extension in the automatic depth control mode is provided through the return line 156 to reservoir.

If the frame 14 raises above a preselected position, the corresponding valve 86 will move to the slow lower "C" position so that the port 96 is open through the restrictor 119 to the port 94 connected to the return line 70 for permitting the piston of the cylinder 38 to retract slowly under the weight of the implement section until the spool of the valve 86 is moved to the balanced position "A". Upon retraction of the cylinder 38 in the depth control mode, make-up oil on the rod end of the cylinder is drawn through the orifice 132 to prevent cavitation. Since depth corrections are very small, the orifice 132 can be made relatively small, preferably on the order of 0.02 inches in diameter, to provide a significant restriction to fluid flow through the orifice 132 when the operator control valve 64 is reversed to pressurize the line 70. In a similar manner, make-up oil for the cylinder 28 is provided through the orifice 144 and the return line 142 in the depth control mode so that cavitation is prevented. The rod end of the cylinder 48 is connected directly to reservoir through the line 156 so that make-up oil can be freely circulated upon retraction of the cylinder. Therefore, during the automatic depth control mode, the cylinders 28, 38 and 48 function automatically, in parallel, as single acting cylinders through their respective depth control valve structures 78.

For fast raise to the transport position, the operator control valve 64 is moved to the left as shown in FIG. 1 to pressurize the line 70 and to return the line 68 to reservoir. The spool of the valve 86 moves to its leftmost "D" position (FIG. 2) to thereby directly connect the input port 94 of the first depth control valve structure 78 to the line 100 on the frame section 14. The check valve 134 and the flow restrictor 132 prevent any substantial flow of fluid under pressure from the line 70 to the line 138. Therefore, flow through the line 138 to the port 94 of the second valve structure 98 is substantially limited to that fluid flowing from the rod end of the cylinder 38 through the return line 128. The fluid from the line 128 and the small amount of fluid which passes through the orifice 132 is directed via line 138 and valve 78 of the frame section 12 to the base end of the cylinder 28 so that the cylinder 28 acts essentially in series with the cylinder 38. In a similar manner, the restrictor 144 and the check valve 146 of the second flow control structure 84 prevent any significant flow from the line 138 to the line 148. Therefore, fluid flow to the line 148 during extension of the cylinders in the fast raise mode is provided essentially through the line 142 connected to the rod end of the cylinder 28. The fluid from the rod end of the cylinder 28 and the small amount of fluid passing through the restrictor 144 is communicated through the line 148 to the input port 94 of the third valve structure 78 and through the line 100 to the base end of the cylinder 48 to thereby cause the cylinder 48 to extend substantially in series with the cylinders 28 and 38. The valve and conduit structure 72 therefore cause the cylinders to extend in series fashion to raise the frames 12, 14 and 16 substantially in unison during the fast raise mode.

When the implement 10 is raised toward the transport position and above the depth control range of the sensing structure 110, the spools of each of the valves 86 will be in the fast raise/fast lower position "D" so that upon return of the operator control valve to the automatic depth control position (to the right as viewed in FIG. 1) each of the lines 100 will be opened through the corresponding valve structure 78 to the line 70 and to the reservoir so that the cylinders 28, 38 and 48 will retract under the weight of the respective sections to cause the implement 10 to move towards the ground-working position at a relatively fast rate. Under most conditions, the frame sections will lower substantially in unison due to the effect of the flow control structures 82 and 84. Upon retraction, the first cylinder 38 will tend to draw hydraulic fluid into its rod end through the lines 128 and 138 from the cylinder 28 next in line. In similar manner, the cylinder 28 will draw fluid through the line 142 and 148 from the cylinder end of the next cylinder 48. Therefore, because of the action of the flow control structures 82 and 84, the make-up oil for the rod end of any given cylinder will be substantially applied from the cylinder end of the next cylinder in line.

Figure 3:
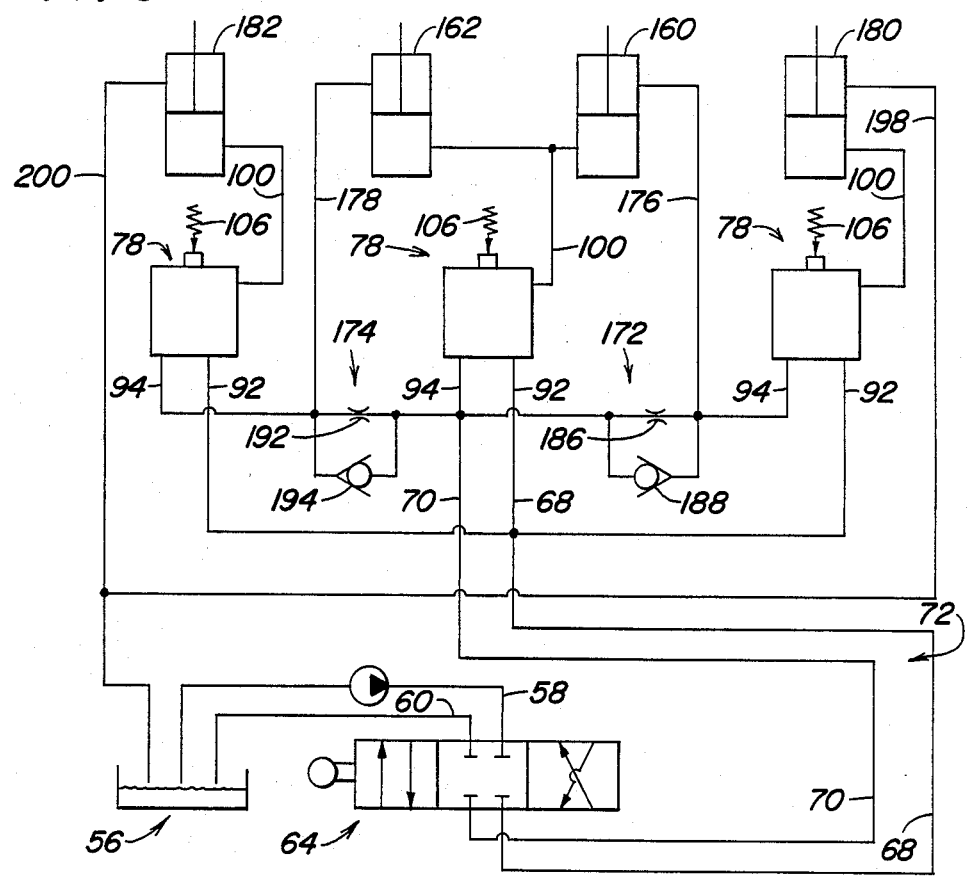
FIG. 3 is a diagramatic illustration of an alternate embodiment of the hydraulic system for an implement having two parallel connected cylinders on one frame section.

FIG. 3 shows an alternate embodiment of the invention wherein two cylinders 160 and 162 are operated side-by-side in parallel on the main implement frame and are controlled by first depth control valve structure 78. In such a system, the cylinders 160 and 162 are typically constrained to operate in unison by a mechanical linkage such as a rockshaft (not shown). The cylinder ends of the cylinders 160 and 162 are connected together and to the output port 96 of the valve 86 via line 100. The rod ends of the cylinders 160 and 162 are connected through flow control structures 172 and 174, respectively, and return lines 176 and 178 to the input port 94 of the valve structure 78. First and second outrigger cylinders 180 and 182 have cylinder ends connected through the corresponding lines 100 to their respective depth control valve structures 78. The input port 94 of each of the depth control valve structures 78 on the outriggers is connected directly to the line 68 from the operator control valve 64. The input port 92 for the valve 86 controlling the cylinder 182 is connected through the flow control structure 174 to the line 70. Likewise, the input port 94 for the valve 86 controlling the cylinder 180 is connected through the flow control structure 172 to the line 70. The flow control structure 172 includes a restrictor 186 in parallel with a check valve 188. The flow control structure 174 includes a restrictor 192 in parallel with a check valve 194. In the automatic depth control mode, the depth control valve structures 78 are operated with their associated cylinders substantially in parallel. However, when the operator reverses the valve 64 so that the line 70 now becomes pressurized to thereby extend the cylinders and raise the implement toward the transport position, the check valves 188 and 194 and the restrictors 186 and 192 prevent substantial flow of fluid under pressure from the line 70 towards the ports 94 on the outrigger control valve structures 78. This action causes the cylinder 180 to substantially operate in series with the adjacent cylinder 160. In a similar manner, the cylinder 182 operates in series with the cylinder 162. Upon lowering the implement by retracting the cylinders, make-up oil for the rod end of the cylinders 160 and 162 is generally supplied from the cylinder ends of the corresponding outrigger cylinders 180 and 182. Make-up oil for the rod end of the cylinders 180 and 182 is provided by return lines 198 and 200.

Figure 4:
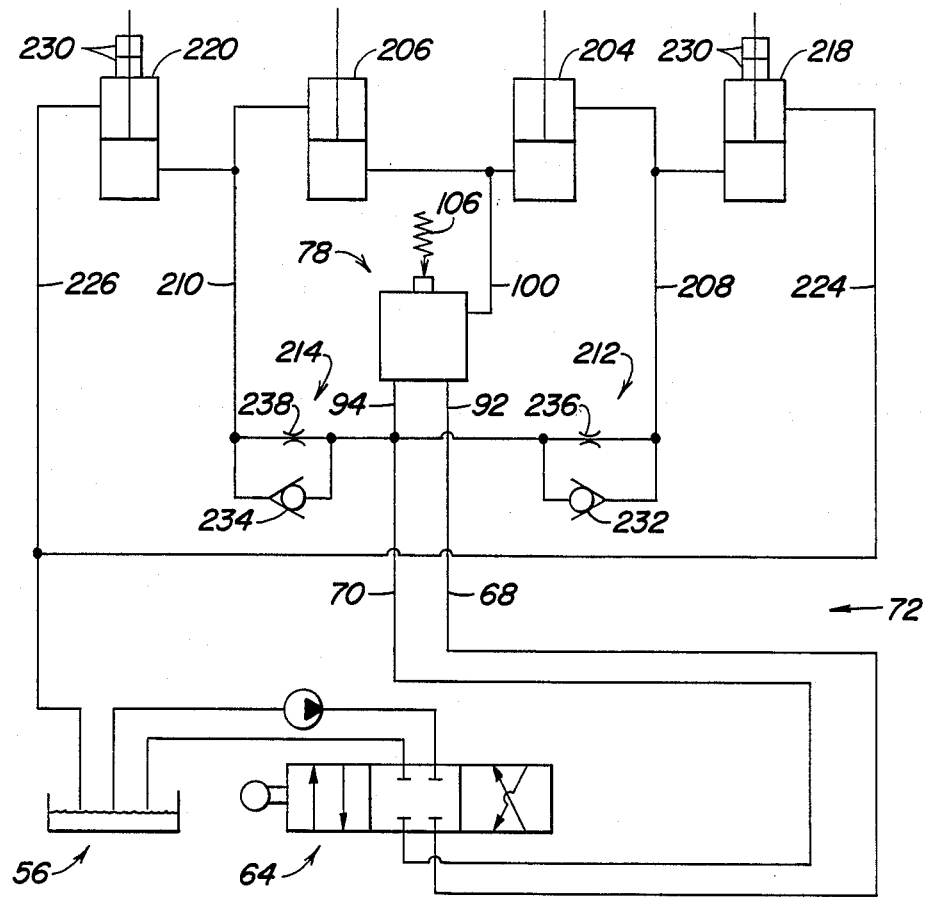
FIG. 4 is a diagramatic illustration of an embodiment similar to that of FIG. 3 but wherein automatic depth control is provided only on the center section, with mechanical depth stops on the outriggers.

FIG. 4 shows an alternate embodiment of the invention for utilization with an implement having multiple lift cylinders wherein only the center cylinders are controlled automatically, for example, a multi-sectioned seeding implement wherein the seed tank is carried on the center section so that excess weight and changing tank weight would otherwise cause the center section depth to vary to a much greater extent than outrigger frame depth. As shown, a pair of innermost cylinders 204 and 206 have their cylinder ends connected together and to the line 100 from the corresponding depth control valve structure 78. The cylinders 204 and 206 are typically tied together by a rockshaft or the like to operate in unison on the center section of the implement. The rod ends of the cylinders 204 and 206 are connected through lines 208 and 210, and through flow control structures 212 and 214, to the hydraulic line 70. Outermost lift cylinders 218 and 220 on corresponding wing sections have their cylinder ends connected to the lines 208 and 210, respectively. The rod ends of the cylinders 218 and 220 are connected through lines 224 and 226 to reservoir. Assuming the implement is in the raised transport position with the cylinders extended, movement of the operator control valve 64 to the right to the automatic position will open line 70 to reservoir and permit the cylinders to retract under the weight of the implement. Mechanical stops 230 on the outrigger cylinders 218 and 220 limit the retraction of the cylinders to a preselected position corresponding to the desired working depth of the implement. Make-up oil for the rod end of the cylinders 204 and 206 is generally provided from the cylinder ends of the cylinders 218 and 220 to help provide uniform lowering of the implement across its width. When the implement frame reaches a position within the automatic control range of the structure 78, adjustment of center section height is achieved automatically through the structure 78 and the center cylinders 204 and 206 to compensate for changing tank weight and soil conditions, etc. To raise the implement quickly towards the transport position, the operator control valve is moved to the left to pressurize the line 70. The valve spool of the valve 86 moves to the fast raise/fast lower position "D" to provide fluid under pressure to the line 100 to extend the cylinders 204 and 206. The check valves 232 and 234, and the orifices 236 and 238 of the respective flow control structures 212 and 214 prevent substantial flow of fluid under pressure from line 70 into the lines 208 and 210. The flow of fluid under pressure to the cylinder ends of the cylinders 218 and 220 is provided primarily from the rod ends of the respective cylinders 204 and 206. Therefore, in the fast raise mode, the cylinder 220 will act essentially in series with the cylinder 206 and the cylinder 218 will act in essentially in series with the cylinder 204 so that the center and outrigger sections will lift in unison and the implement frame will be raised in a level fashion. The orifices 236 and 238 provide a path from reservoir to the rod ends of the cylinders 204 and 206 to provide make-up oil to the rod ends during the slight corrections made in the automatic depth control mode.

By way of example only, a typical hydraulic system on a tractor can supply up to 18 gallons or more per minute of hydraulic fluid under pressure. The orifices 132, 144; 186, 192; and 236, 238 of the selected embodiments of the invention typically limit the rate of flow therethrough to approximately 0.4 gallons per minute or less so that more than approximately 97 percent of the fluid to the cylinder end of a given cylinder (for example, cylinder 48 in FIG. 1) is provided by flow from the rod end of the preceding cylinder (28 in FIG. 1). Because cylinder rod movement during depth control corrections are very slight, the restricted flow through the orifices has little effect upon depth control operation. The orifices 118, 119 in the valve 86 typically restrict fluid flow in the slow raise "B" and the slow lower "C" positions to approximately 0.25 gallons per minute. The net result is that each system will function in parallel during the depth control mode and will also raise and lower approximately in series so that level raising and lowering of a complete implement is achieved with a single operator control valve and with relatively few additional components. The system is also simplified by utilizing a single acting cylinder arrangement.

Having described the preferred embodiment, it will be apparent that modifications can be made without departing from the scope of the invention as defined in the accompanying claims.

I claim:

1. In an argricultural implement having a transversely extending frame supporting earthworking tools, and at least first and second cylinders connected to lift structures for raising and lowering the frame between ground-working and transport positions and for controlling soil penetration of the tools when the frame is in the ground-working position, a cylinder control system comprising:
   automatic depth control means for operating the cylinders in an automatic depth control mode when the frame is in the ground-working position;
   flow control means connected to the cylinders for constraining the cylinders to operate substantially in series as the frame is raised toward the transport position so that the frame raises uniformly across its width and permitting the cylinders to operate substantially in parallel in the automatic depth control mode, said flow control means including pressure responsive check valve means connected between the automatic depth control means and the first cylinder for automatically directing fluid flow from the first cylinder to the second cylinder as the frame is raised toward the transport position, and from the first cylinder away from the second cylinder when operating in the depth control mode.

2. In an agricultural implement having a transversely extending frame supporting earthworking tools, and at least first and second lift cylinders, each with cylinder and rod ends, said cylinders connected to lift structures for raising and lowering the frame between ground-working and transport positions and for controlling soil penetration of the tools when the frame is in the ground-working position, a cylinder control system comprising:
   automatic depth control means for operating the cylinders in an automatic depth control mode when the frame is in the ground-working position;
   flow control means connected to the cylinders for constraining the cylinders to operate substantially in series as the frame is raised toward the transport position so that the frame raises uniformly across its width and permitting the cylinders to operate substantially in parallel in the automatic depth control mode; and
   wherein the depth control means includes a depth control valve, means connecting the depth control valve to the cylinder end of the first cylinder, means connecting the rod end of the first cylinder to the cylinder end of the second cylinder, said flow control means for directing a substantial portion of the fluid flow from said rod end of the first cylinder to the cylinder end of the second cylinder as the frame is raised toward the transport position and permitting relatively unrestricted fluid flow from the rod end of the first cylinder away from the second cylinder in the automatic depth control mode.

3. The invention as set forth in claim 2 wherein the system includes a fluid source having pressure and return to reservoir lines and said depth control valve comprises a multi-position valve having first and second input ports and an output port connected to the cylinder end of the first cylinder, valve means for selectively connecting the pressure and return lines to the first and second input ports for operation in the depth control mode, said valve means including means for reversing the lines with respect to the valve inputs for establishing a fast raise mode, and wherein the flow control means comprises means for limiting fluid flow from the rod end of the first cylinder towards the reservoir in the fast raise mode.

4. The invention as set forth in claim 3 wherein the means for limiting comprises a check valve, and further including an orifice connected in parallel with the check valve for permitting make-up fluid to flow toward the rod end of the first cylinder upon retraction of the first cylinder in the automatic depth control mode.

5. The invention as set forth in claim 3 wherein the cylinders are single acting cylinders, and the multi-position valve includes a slow raise position for providing restricted hydraulic fluid flow from the pressure line to the first cylinder; a slow lower position for permitting restricted fluid flow from the first cylinder to the return to reservoir line; and a fast raise position for providing relatively unrestricted fluid flow from the pressure line to the first cylinder in the fast raise mode.

6. The invention as set forth in claim 5 wherein the flow control means includes an orifice connected in parallel with a check valve and permitting restricted fluid flow from the return to reservoir line to the rod end of the first cylinder upon retraction of the rod end of the first cylinder in the automatic depth control mode.

7. In an agricultural implement having a transversely extending frame supporting earthworking tools, and at least two cylinders connected to lift structures for raising and lowering the frame between ground-working and transport positions and for controlling soil penetration of the tools when the frame is in the ground-working position, a cylinder control system comprising:
a source of hydraulic fluid under pressure;
a fluid reservoir;
a multi-position depth control valve having first and second input ports, and an output port;
reversible control valve means having an automatic depth control position and a fast raise position for selectively connecting the input ports to the source of fluid and to the reservoir;
means connecting the output port to the first cylinder port of one of the cylinders for operation of said one of the cylinders by the valve as a single acting cylinder;
means connecting the second cylinder port of said one of the cylinders to the first cylinder port of the second cylinder;
wherein said depth control valve is operable between a slow raise and a slow lower position when the control valve means is in the automatic depth control position, said valve including means for establishing a third position when the control valve means is reversed to the fast raise position;
means responsive to implement frame height for operating the depth control valve to control said one of the cylinders and maintain a preselected soil penetration of the tools when the reversible control valve means is in the automatic depth control position; and
flow control means connected between the second cylinder port and the reversible control valve means for permitting relatively unrestricted fluid flow between said second cylinder port and the reservoir when the control valve means is in the automatic depth control position and directing substantially all the fluid flow from said second cylinder port to the second cylinder for operating the cylinders substantially in series when the control valve means is in the fast raise position.

8. The invention as set forth in claim 7 including a second multi-position depth control valve having a first input port connected to the first input port of the first-mentioned depth control valve, and a second input port connected to the second cylinder port of the first cylinder through the flow control means, and an output port connected to the second cylinder; and means responsive to implement frame height adjacent the second cylinder for operating the second depth control valve when the reversible control valve is in the automatic depth control position.

9. The invention as set forth in claim 7 wherein the flow control means comprises a check valve which, when the control valve means is in the automatic depth control position, opens to reservoir and when the control valve means is in the fast raise position, prevents flow therethrough from the source to the second cylinder.

10. The invention as set forth in claim 9 including an orifice in parallel with the check valve.

11. In an agricultural implement having a transversely extending main frame and at least one outrigger frame pivotally connected to the main frame, earth-working tools carried by the frames, and vertically adjustable ground wheels supporting the respective frames and movable between transport and field-working positions, hydraulic lift structure comprising:
main and outrigger cylinders operably connected to the main and outrigger frame ground wheels, respectively, for moving the frames between the transport and field-working positions;
a source of hydraulic fluid under pressure;
depth control valve means connected to the main frame cylinder and the source of fluid for operating the main frame cylinder to maintain a preselected depth of penetration of the earthworking tools on the main frame when in the field-working position;
an operator valve connected between the source and the depth control valve means and having an automatic depth control position and a raise to transport position;
conduit means connecting the main frame cylinder to the outrigger frame cylinder;
flow control means connected between the conduit means and the operator valve for directing fluid flow from the main frame cylinder to the outrigger frame cylinder and causing the cylinders to operate substantially in series when the operator valve is in the raise to transport position so that the frames raise in unison toward the transport position; and
wherein said flow control means includes means for permitting parallel operation of the depth control valve means and main frame cylinder when the operator valve is in the depth control position.

12. The invention as set forth in claim 11 including second depth control valve means connected between the outrigger cylinder and the conduit means for operating the outrigger cylinder in parallel with the main frame cylinder to control outrigger tool depth independently of main frame tool depth when the operator valve is in the automatic depth control position.

13. The invention as set forth in claim 11 wherein the outrigger frame includes mechanical depth stop means for establishing a preselected depth of penetration of the outrigger frame tools independently of the preselected depth of penetration of the main frame tools maintained by the depth control valve means.

14. The invention as set forth in claim 11 including two main frame cylinders connected together for operation in parallel and in unison, wherein the conduit means is connected to only one of said two main frame cylinders, and wherein the implement includes a second outrigger frame pivotally connected to the main frame and a second outrigger frame lift cylinder, and means for connecting the second outrigger frame lift cylinder to the other of said two main frame cylinders for operation in series therewith when the operator valve is in the raise to transport position.

15. The invention as set forth in claim 14 wherein the cylinders are single acting cylinders.

16. The invention as set forth in claim 14 including individual depth control valve structure connected between each of the outrigger cylinders and the corresponding main frame cylinder for providing individual outrigger frame depth control independently of the main frame cylinder operation.

17. The invention as set forth in claim 16 wherein the flow control means includes means for permitting operation of the cylinders in parallel when the operator valve is in the automatic depth control position.

* * * * *

UNITED STATES PATENT AND TRADEMARK OFFICE
CERTIFICATE OF CORRECTION

PATENT NO. : 4,821,806

DATED : April 18, 1989

INVENTOR(S) : David C. Winter

It is certified that error appears in the above-identified patent and that said Letters Patent is hereby corrected as shown below:

Column 10, line 48, change "valve inputs" to

-- input ports --.

Signed and Sealed this

Twelfth Day of March, 1991

*Attest:*

HARRY F. MANBECK, JR.

*Attesting Officer*  *Commissioner of Patents and Trademarks*